United States Patent
Hausl

(10) Patent No.: US 9,366,368 B2
(45) Date of Patent: Jun. 14, 2016

(54) PIPE COUPLING

(71) Applicant: GE Jenbacher GmbH & Co OG, Jenbach (AT)

(72) Inventor: Gunter Hausl, Jenbach (AT)

(73) Assignee: GE JENBACHER GMBH & CO OG, Jenbach (AT)

( * ) Notice: Subject to any disclaimer, the term of this patent is extended or adjusted under 35 U.S.C. 154(b) by 134 days.

(21) Appl. No.: 13/798,717

(22) Filed: Mar. 13, 2013

(65) Prior Publication Data

US 2014/0261830 A1 Sep. 18, 2014

(51) Int. Cl.
*F16L 55/115* (2006.01)
*F16L 21/00* (2006.01)
*F16L 21/08* (2006.01)
*F16L 55/11* (2006.01)

(52) U.S. Cl.
CPC ............ *F16L 21/005* (2013.01); *F16L 21/08* (2013.01); *F16L 55/11* (2013.01)

(58) Field of Classification Search
CPC .................................................. F16L 55/115
USPC ................ 138/89, 90, 96 R, 97; 220/310.1; 215/354
See application file for complete search history.

(56) References Cited

U.S. PATENT DOCUMENTS

| | | | | |
|---|---|---|---|---|
| 793,330 A * | 6/1905 | Thatcher | ...................... | 215/324 |
| 889,872 A * | 6/1908 | Conrad | .......................... | 215/354 |
| 2,526,238 A * | 10/1950 | Kendall | ......................... | 138/89 |
| 2,667,139 A * | 1/1954 | Campbell | .................... | 269/48.1 |
| 3,207,184 A | 9/1965 | Lambert | | |
| 3,574,312 A * | 4/1971 | Miller | ......................... | 138/96 R |
| 3,661,184 A * | 5/1972 | Lachenmayer | ................. | 138/89 |
| 3,713,463 A * | 1/1973 | Bywater, Jr. | .................... | 138/89 |
| 3,744,528 A * | 7/1973 | Vestal | ............... | 138/89 |
| 4,607,664 A | 8/1986 | Carney et al. | | |
| 5,758,693 A * | 6/1998 | Caine | .............................. | 138/89 |
| 5,850,854 A | 12/1998 | Carroll | | |
| 6,363,973 B1 | 4/2002 | Fiebig | | |
| 6,568,430 B1 * | 5/2003 | Shafer | ......................... | 138/96 R |
| 7,396,053 B2 | 7/2008 | Webb et al. | | |
| 7,487,801 B2 * | 2/2009 | Zeyfang | ...................... | 138/96 R |
| 7,533,699 B1 * | 5/2009 | Cellemme et al. | .............. | 138/89 |
| 2006/0049636 A1 | 3/2006 | Webb et al. | | |
| 2008/0224079 A1 | 9/2008 | Maruyama et al. | | |
| 2012/0169041 A1 * | 7/2012 | King et al. | ...................... | 285/88 |

FOREIGN PATENT DOCUMENTS

| | | |
|---|---|---|
| DE | 199 49 697 | 4/2001 |
| EP | 1 087 172 | 3/2001 |
| GB | 564070 | 3/1943 |
| GB | 2 342 970 | 4/2000 |
| GB | 2 389 395 | 12/2003 |

OTHER PUBLICATIONS

European Search Report issued Jun. 25, 2014 in corresponding European Patent Application No. EP 12 159 867.6.

* cited by examiner

*Primary Examiner* — Donnell Long
(74) *Attorney, Agent, or Firm* — Wenderoth, Lind & Ponack, L.L.P.

(57) ABSTRACT

A pipe coupling can be coupled with one of its ends to a pipe, and has a clamping band and a tightening device for tightening the clamping band. A cover is provided on the other end of the pipe coupling, and the cover is inserted in the clamping band and can be secured by tightening the tightening device of the clamping band. The invention further relates to the use of the pipe coupling.

14 Claims, 2 Drawing Sheets

PIPE COUPLING

BACKGROUND OF THE INVENTION

The invention relates to a pipe coupling, which can be coupled by one of its ends to a pipe and which has a clamping band and a tightening means for tightening the clamping band. The invention further relates to the use of the pipe coupling.

The nearest prior art is GB 2 389 395 A, which discloses a pipe coupling with anchoring rings. The pipe coupling disclosed in this document is used for joining two pipes together. Often, however, one is faced with the problem of hermetically closing off the end of a pipe. This is necessary, for example, when the pipe is temporarily to be tested for leaks or resistance to pressure or when certain pipe connections will not be used, temporarily or permanently. Moreover, this problem also arises for example with modular or serial arrangements of machines, in which the last machine in the row has no subsequent coupling and the tubular connection or connector otherwise provided for this has to be sealed.

In the prior art there are numerous solutions for sealing the ends of pipes.

The device shown in EP 1 087 172 A2 requires a correspondingly designed pipe end, so that the closure element that is put over the free end of the pipe can be secured with a clamp.

A cover plate according to DE 199 49 697 A1 has a collar with at least three outward-projecting clamping elements, which after insertion of the collar into the free end of the pipe, bear against its inside wall and fix a cover plate in the end of the pipe.

The end plate disclosed in GB 2 342 970 A is fixed to the end of a pipe by means of a separate clamp and several sealing elements and spacers.

According to GB 564,070 A, a free end of a pipe provided with an external thread is sealed with a cover, which also has a peripherally arranged external thread. The cover is fixed on the end of the pipe by means of a coupling nut.

Apart from the fact that some of these solutions only represent a poorly sealing pipe termination, a substantial drawback is that the pipe end in question must have a shape specially designed for covering with corresponding fixing devices. For example, it is necessary to provide threads, screws, and grooves for a clip-in cover or outward-projecting flanges. The solutions proposed in the prior art can therefore only be implemented in conjunction with very specific and therefore also expensive pipes. In addition, closing off the pipe on the basis of special shapes and fasteners is very expensive.

SUMMARY OF THE INVENTION

The object to be achieved by the present invention is therefore to overcome these drawbacks and provide a pipe coupling that can be coupled with one of its ends to a pipe, and that at the same time brings about closing of the pipe. It should also be possible to connect the pipe coupling to conventional pipes, produced without special shaping or securing devices on their ends. Securing of the pipe coupling on the pipe should be simple, rapid and reliable. Closing of the pipe should be hermetic, reliable and preferably pressure-resistant.

These objects are achieved with a pipe coupling of the type stated at the beginning, by providing a cover on the other end of the pipe coupling, which is inserted in the clamping band and can be secured by tightening the tightening means of the clamping band.

The same mechanism that is used for clamping the pipe coupling on the pipe, namely tightening the clamping band by the tightening means, is used according to the invention for fixing the cover. This results in simple construction and reliable fixing of the cover in the region of the end of the pipe coupling opposite the pipe.

A "pipe coupling" means, in the present application, a device that can be coupled with one of its ends to a pipe and joins this pipe to a cover for closing off the pipe.

The pipe coupling is preferably designed so that the pipe to be connected can be inserted axially into the pipe coupling. With the pipe inserted, the clamping band (sleeve) is tightened with the tightening means, so that the pipe coupling is fixed on the corresponding end of the pipe.

The tightening means can be of any design, such that when it is actuated, the clamping band formed in the manner of a pipe clamp is squeezed together or drawn together. In this way, the cross-sectional area surrounded by the clamping band is reduced, the pipe coupling is fixed on the pipe and the cover is clamped or held on the other side. Preferably, the tightening means consists of at least one screw connection, which is connected to the two segments of the clamping band opposite one another, forming a gap. On actuating the screws, the width of the gap changes.

To produce a pipe coupling with a cover according to the invention, a conventional pipe coupling can be used and can be provided with an appropriately-adapted cover on one of its ends.

Preferably, a sealing element, preferably of an elastic material, e.g. rubber, is provided in the clamping band, with which a reliably sealing joint can be achieved, on the one hand with the pipe and on the other hand with the cover. Preferably, the sealing element lines the whole surface of the inside wall of the clamping band, which can provide advantageous sealing along the whole circumference and especially also in the region of the tightening means.

An end segment of the sealing element is preferably clamped between the clamping band and the cover, so that particularly reliable sealing is achieved. This sealing is additionally brought about or reinforced by tightening the clamping band and the associated pressing of the end segment of the seal against the inside of the clamping band on the one hand and against the cover on the other hand.

The cover is preferably pot-shaped, advantageously with its bottom section turned towards the inside of the pipe coupling. The opening of the pot-shaped cover is thus turned away from the inside of the pipe coupling. This design of the cover results in a cover that is easy to manipulate and insert into the clamping band in the correct position. At the same time, the pot-shaped configuration creates higher pressure resistance of the covering created by the cover against pressures in the connected pipe.

Preferably the bottom section of the pot-shaped cover has a convexity, which advantageously projects into the interior of the pipe coupling. As a result, the pressure resistance is further increased, as the forces are to a large extent led into the walls of the pot-shaped cover.

Preferably the edge region of the cover has a conically shaped segment, which becomes wider towards the free end and its surface facing the clamping band advantageously has a positive fit on a correspondingly shaped segment of the sealing element. On the one hand, this configuration produces a larger sealing area. On the other hand, by axial pressing of the cover in the direction of the sealing element, the efficiency of sealing can be increased. The pressing of the cover can be brought about, for example, by a flange on the end face of the clamping band in conjunction with the clamping or tightening of the clamping band.

Preferably, the cover has an essentially cylindrical segment, which preferably has a positive fit on a correspondingly shaped segment of the sealing element. As a result of this, the sealing area can be further increased. In addition, tightening of the clamping band exerts a radial force on the contact surfaces of the cylindrical segment and of the sealing element, which brings about reliable pressing together of the two parts.

The cylindrical segment is preferably formed by the wall of the aforementioned pot-shaped cover.

Preferably, the cylindrical segment of the cover connects to the conically shaped segment of the cover in the direction of the inside of the pipe coupling. This provides a simple, space-saving solution, wherein in particular the forming of the end segment of the sealing element is simplified.

Preferably, the cover is completely surrounded by the clamping band, producing a space-saving construction, which also protects the cover against mechanical influences.

Preferably, the clamping band has, on at least one of its end faces, an inward-directed flange, which forms a stop for the cover inside the clamping band. On the one hand this prevents unintentional removal of the cover. On the other hand, by means of the flange and by tightening the tightening means, the cover can be pressed against the sealing element.

Preferably, the clamping band is formed from a continuous, tubular, pre-curved band, wherein a gap is formed in the region of the ends of the band, so it is possible to vary the width of the gap with the tightening means. This represents an especially simple, but easily manipulated, configuration of the invention.

An anchoring ring, preferably of truncated cone shape, projecting into the interior of the pipe coupling, is preferably provided, and advantageously is arranged in the region of the end of the pipe coupling that is opposite the end of the pipe coupling with the cover. On tightening the tightening means, the free end of the anchoring ring comes up against the external wall of the pipe and, depending on the material properties of the pipe, correspondingly digs into it. As a result, the pipe coupling and therefore also the cover are fixed in position especially advantageously.

The object is also achieved according to the invention by using a pipe coupling for closing off a pipeline.

The pipe coupling is preferably used for temporary closing-off of a pipeline when testing one or more pipe functions, especially resistance to pressure and/or for leak testing.

The pipe coupling is preferably used in a modular arrangement of gas engines as a closing element for the last module.

In all applications of the pipe coupling according to the invention, an existing pipe coupling, which joins two pipes together, can be dismantled. One pipe is removed (at least temporarily) and in place of the pipe, a cover according to the invention is inserted and clamped. Therefore, no additional devices are required for closing off a pipe, which in many applications makes manipulation much easier and more economical.

BRIEF DESCRIPTION OF THE DRAWINGS

Further advantages, features and details of the invention can be seen from the following description, in which embodiments of the invention are described, referring to the drawings. The features mentioned in the claims and in the description may in each case be important for the invention individually or in any combination.

The list of reference symbols forms part of the disclosure. The figures are described in context and in general. Identical reference symbols denote identical components, and reference symbols with different indices denote functionally equivalent or similar components.

In the drawings:

FIG. 1 shows a pipe coupling according to the invention in perspective view,

FIG. 2 shows the pipe coupling from FIG. 1 in cross-section through the longitudinal axis, FIG. 3 shows detail B from FIG. 2 shown enlarged, and FIG. 4 shows an anchoring ring, which can optionally be inserted between flange and cover.

DETAILED DESCRIPTION OF THE INVENTION

Figure 1:
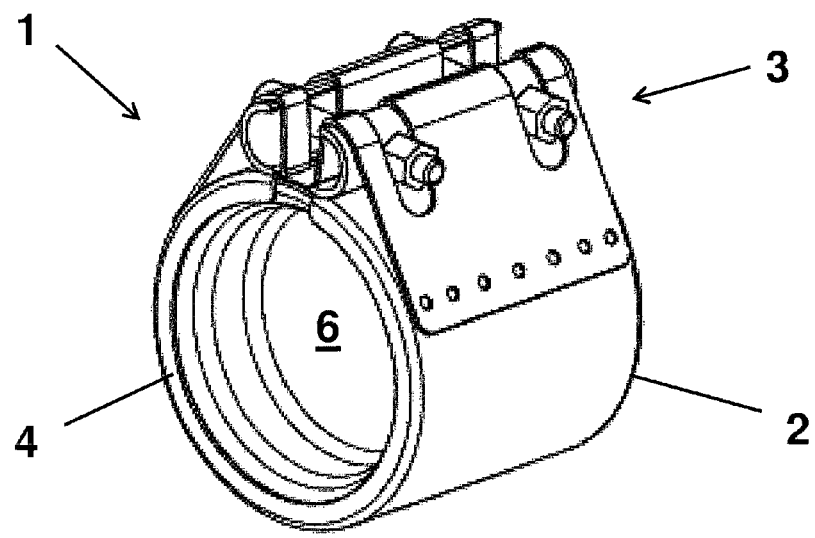

FIG. 1 shows a pipe coupling 1, which can be coupled with a first one of its ends 11 to a pipe 13 (not shown in FIG. 1). For this purpose, the pipe coupling 1 has a clamping band 2 and a tightening device 3 for clamping or tightening the clamping band 2. The other (second) end 12 (not visible in FIG. 1) of the pipe coupling 1 is closed off by a cover 6 inserted in the clamping band 2 and clamped by tightening the clamping band 2.

In the embodiment shown, the cover 6 is completely surrounded by the clamping band 2. Furthermore, the clamping band 2 has, on both of its end faces, in each case an inward-directed flange 4, which serves as a stop for the cover 6 inside the clamping band 2 and securely retains the cover 6 when pressure is applied.

In the embodiment shown, the clamping band 2 is formed from a continuous, tubular pre-curved band. A gap (shown at the top in FIG. 1) is formed in the region of the ends of the band, the gap width being variable by means of the tightening device 3.

Figure 2:
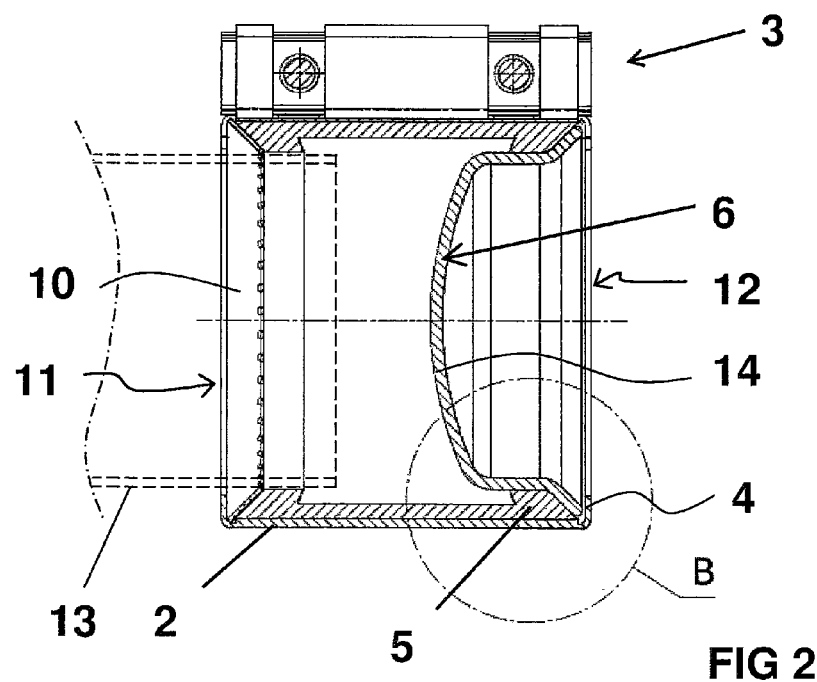

FIG. 2 shows a section along the longitudinal axis of the pipe coupling 1. An essentially tubular sealing element 5, preferably made of an elastic material, such as rubber, is inserted in the clamping band 2 and lines the inside wall of the clamping band 2 essentially completely. An end segment of the seal 5 is clamped between the clamping band 2 and the cover 6.

Figure 3:
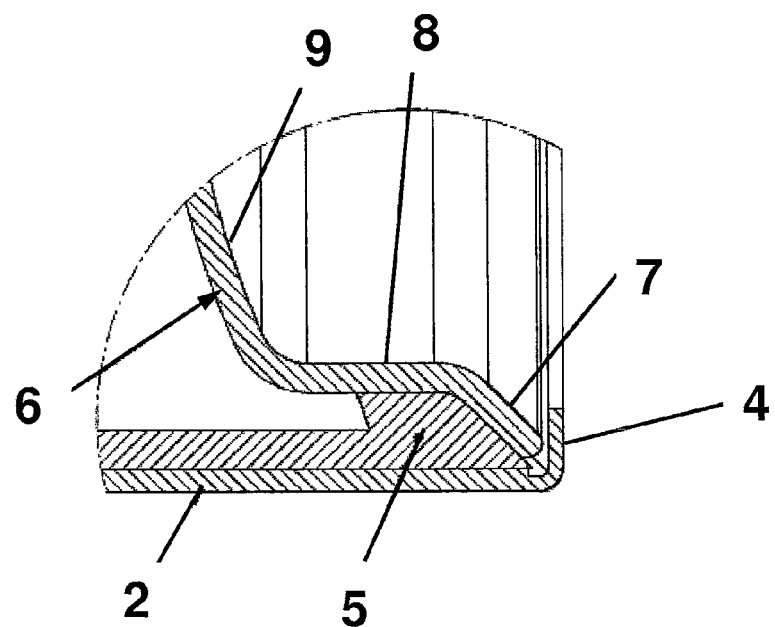

As can be seen from FIGS. 2 and 3, the cover 6 is pot-shaped, with its bottom section 14 turned (protruding) towards the inside of the pipe coupling 1 and its opening facing away from the inside of the pipe coupling 1. The bottom section 14 of the pot-shaped cover 6 has a convexity 9, which projects into the interior of the pipe coupling 1.

The wall of the pot-shaped cover 6 has two different segments 7 and 8. The edge region of the pot-shaped cover 6 has a conically shaped segment 7, which becomes wider towards the free end and its surface facing the clamping band 2 has a positive fit on a correspondingly shaped segment of the sealing element 5.

The conical segment 7 connects to an essentially cylindrical segment 8, which in the preferred embodiment shown has a positive fit on a correspondingly shaped segment of the sealing element 5. The cylindrical segment 8 connects to the conically shaped segment 7 in the direction of the inside of the pipe coupling 1.

Figure 4:
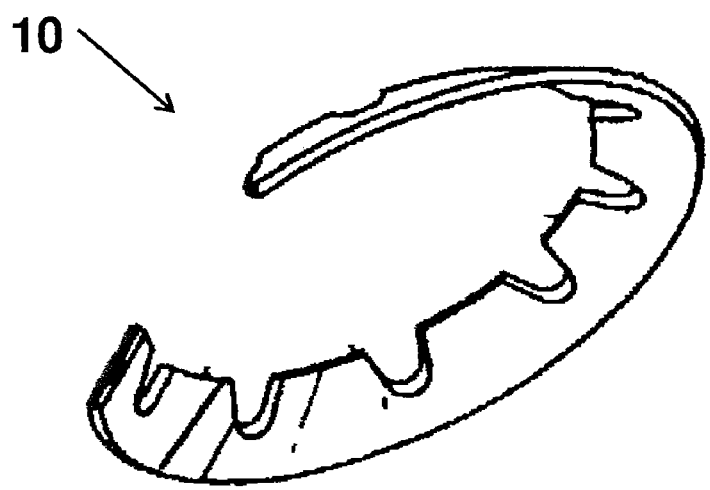

In a preferred embodiment, the pipe coupling 1 has, in the region of its first end 11, an open anchoring ring 10, preferably of truncated cone shape, which is interposed between the corresponding flange 4 and the corresponding segment of the sealing element 5. Upon tightening the tightening device 3, the anchoring ring 10 is clamped and is pressed inward in the direction of the cover 6 and/or onto the external wall of the pipe 13. A preferred configuration of the anchoring ring 10 with inward-directed teeth for better grip is shown in FIG. 4.

A pipe coupling 1 according to the invention is suitable in particular for closing off a pipeline 13 or a tubular connector. It is especially suitable for the temporary closing-off of a pipeline or of a tubular connector when testing one or more pipe functions, especially resistance to pressure and/or for leak testing.

A special application of the pipe coupling relates to a modular arrangement of gas engines as a closing element for the last module. In this case, gas engines arranged in series are joined together by pipelines or connectors. However, the connector projecting from the last gas engine in the series does not have anything to connect to. For closing off and marking this "last" connector, this can be provided simply and reliably with a pipe coupling according to the invention and can thus be closed off.

The invention is of course not limited to the embodiment presented above. The individual features described above can be implemented jointly, but also independently of one another. The essence relates to a pipe coupling with a tightening device, also called "grip-coupling", with an inserted or integrated cover as a closing element, in particular for a pipeline.

LIST OF REFERENCE SYMBOLS

1 pipe coupling
2 clamping band
3 tightening means
4 flange
5 seal
6 cover
7 conically shaped segment of cover 6
8 cylindrical segment of cover 6
9 convexity of cover 6
10 anchoring ring
11 end of pipe coupling with anchoring ring
12 end of pipe coupling with cover
12 pipe
14 bottom section of the cover

The invention claimed is:

1. A pipe coupling having a first end to be coupled with a pipe, said pipe coupling comprising:
   a clamping band;
   a tightening device for tightening said clamping band; and
   a pot-shaped cover on a second end of said pipe coupling, said cover being inserted into said clamping band and secured by said tightening device, said cover having a convex bottom section projecting inwardly towards an interior of said pipe coupling; and
   a sealing element made of an elastic material and arranged in said clamping band, said sealing element configured to line an entirety of an inner surface of said clamping band.

2. The pipe coupling according to claim 1, wherein an end segment of said sealing element is clamped between said clamping band and said cover.

3. The pipe coupling according to claim 1, wherein an edge portion of said cover has a conical shape becoming wider towards a free end of said cover, and a surface of said conically-shaped edge portion facing said clamping band has a positive fit on a correspondingly-shaped segment of said sealing element.

4. The pipe coupling according to claim 3, wherein said cover has a cylindrical segment having a positive fit on a correspondingly-shaped segment of said sealing element.

5. The pipe coupling according to claim 4, wherein said cylindrical segment of said cover connects to said conically-shaped segment of said cover inside of said pipe coupling.

6. The pipe coupling according to claim 1, wherein said cover has a cylindrical segment having a positive fit on a correspondingly-shaped segment of said sealing element.

7. The pipe coupling according to claim 1, wherein said cover is completely surrounded by said clamping band.

8. The pipe coupling according to claim 1, wherein said clamping band has a pair of end faces and an inward-directed flange on at least one of said end faces, said flange defining a stop for said cover inside said clamping band.

9. The pipe coupling according to claim 1, wherein said clamping band is formed of a continuous, tubular, curved band, and a gap is defined between ends of said clamping band, said tightening device being configured to vary a width of said gap.

10. The pipe coupling according to claim 1, further comprising an anchoring ring having a truncated cone shape, said anchoring ring projecting into said interior of said pipe coupling and being arranged at said first end of said pipe coupling opposite said second end with said cover.

11. A method of using said pipe coupling according to claim 10 comprising temporarily closing off a pipeline during testing of one or more pipe functions by applying said pipe coupling to the pipeline.

12. The method according to claim 11, wherein said testing of one or more pipe functions comprises at least one of testing resistance to pressure and leak testing.

13. A method of using said pipe coupling according to claim 1 comprising installing said pipe coupling on a pipeline to close off the pipeline.

14. A method of using said pipe coupling according to claim 1 comprising applying said pipe coupling to a last module of a modular arrangement of a gas engine for closing the last module.

\* \* \* \* \*